June 22, 1965

J. SZTRICSKO 3,190,665

KEY OPERATED CHUCK

Filed July 11, 1963

INVENTOR.
JANOS SZTRICSKO

BY

ATTORNEYS

United States Patent Office 3,190,665
Patented June 22, 1965

3,190,665
KEY OPERATED CHUCK
Janos Sztricsko, 489 Dundurn St. S., Hamilton,
Ontario, Canada
Filed July 11, 1963, Ser. No. 294,281
5 Claims. (Cl. 279—1)

This invention relates to a key device for a so-called geared or key operated chuck.

Chucks for tools of which drills are illustrative have long been provided with a ring gear on the outer chuck-jaw tightening sleeve thereof, the gear being engageable by a pinion on a chuck tightening and loosening device or key. The key is selectively mounted so as to have a forward pin portion thereon journalled in a bore in the main body of the chuck on which the sleeve is mounted. The U.S. patent to Jacobs, No. 709,014, September 16, 1902, shows a chuck of this type. Ordinarily, the ring gear on the sleeve and the pinion on the key are made tapered, and the bore or bores in the main body of the chuck are disposed radially of the chuck, to facilitate the mounting of the key on the chuck and the disassembly of the key therefrom when the chuck-tightening or loosening operation is completed.

Chucks of this type are highly successful, as evidenced by their wide use on tools. They possess the inherent characteristic, however, that the imposition of a torque on the key, in either a chuck-tightening or loosening direction tends to cause the teeth on the pinion to climb the teeth on the sleeve, and thus to tend to cause the key to tilt or cant so far as engagement between its forward pin portion and the pin-receiving bore in the body of the chuck permits it, as well as to thrust the key radially outwardly of the chuck toward a position in which the teeth become disengaged. The operator in turning the key may exert a sidewise force thereon, and thus increase the canting of the key and the tendency of the teeth of the pinion thereon to climb on the teeth of the gear on the chuck sleeve. These tendencies, which mutually interact, increase as the torque imposed on the key increases. This makes it difficult to tighten a tool in the chuck in such manner as to insure that the chuck will not turn with respect to the tool under heavy load conditions, and to loosen the chuck when it has been forcefully tightened.

The invention has among its objects the provision of a novel key device for a geared chuck which eliminates the tendency of the key to tilt or cant with respect to the chuck when the key is turned in either a chuck tightening or a chuck loosening direction.

Another object of the invention is the provision of a novel key device which insures the maintenance of the correct angular orientation between the gear on the key and the gear on the chuck during all conditions of use of the key device.

Still another object of the invention, in one preferred embodiment thereof, is the provision of a key device of the type indicated which incorporates means for positively locating the gear on the key in the correct meshing engagement with the gear on the chuck when the key device is mounted in operative position on the chuck.

Further objects of the invention are the provision of a key device of the type indicated which may be applied to a conventional geared chuck without modification of the chuck, which may be easily and quickly applied to a chuck and removed therefrom as required, which is economical to make, which is simple and rugged in construction, and which is easily stored when not in use.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of a geared chuck with which the key device of the present invention may be used;

Figure 1:
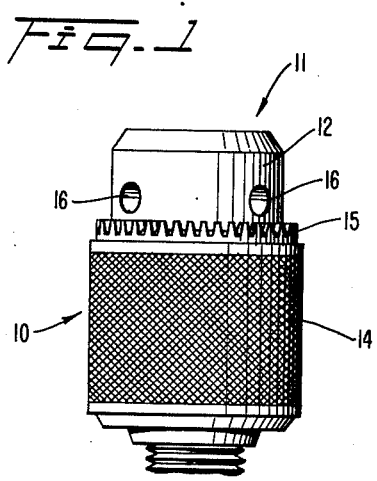
Figure 2:
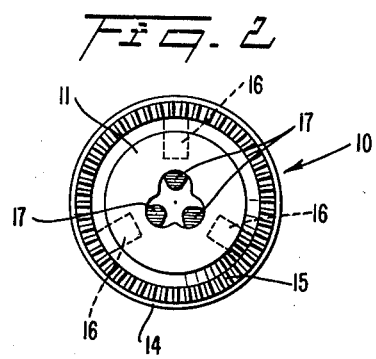
FIG. 2 is a view in plan of the chuck of FIG. 1 with the jaws thereof in partially open position.

Turning now to the drawings, an illustrative geared chuck, designated generally by the reference character 10, is shown in FIGS. 1 and 2. Such chuck has a generally cylindrical main body 11 having an exposed circular cylindrical surface 12 at its forward end. Rotatably mounted about the rear portion of body 11 is a chuck operating sleeve 14, the sleeve being held against axial movement with respect to body 11. A forwardly facing circular beveled rack or ring gear 15 is formed integrally on the forward edge of sleeve 14. The teeth of gear 15 are beveled or tapered so that their tips lie on an upwardly converging frustum of a cone, as shown. Forwardly of gear 15 the body 11 is provided with at least one, and preferably a plurality of, blind radial bores 16, three equally angularly spaced bores being shown. Such bores are adapted to receive the forward pin member of a conventional chuck-operating key. The sleeve 14 is operatively connected by conventional means, not shown, to a plurality of similar tool engaging jaws 17 (three shown) mounted in inclined guideways within body 11, the connecting means being such as to move the jaws simultaneously forwardly and radially toward the axis of body 11 or rearwardly and radially away from the axis of body 11, depending upon the direction of rotation of sleeve 14, whereby to grip the shank of a tool such as a drill between them and to release the tool, respectively. The chuck shown and described is conventional.

Figure 3:
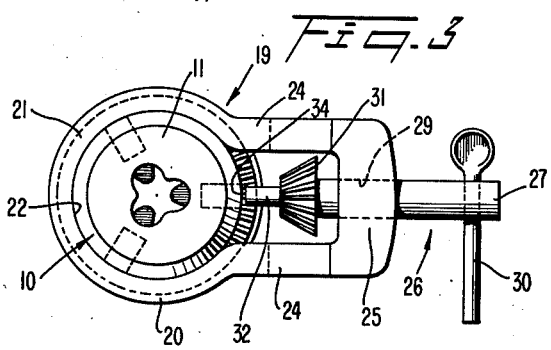
FIG. 3 is a view in plan of a key device in accordance with the invention mounted on the chuck of FIGS. 1 and 2, which is likewise shown in plan, the key of the key device being shown retracted from engagement with the chuck.
Figure 4:
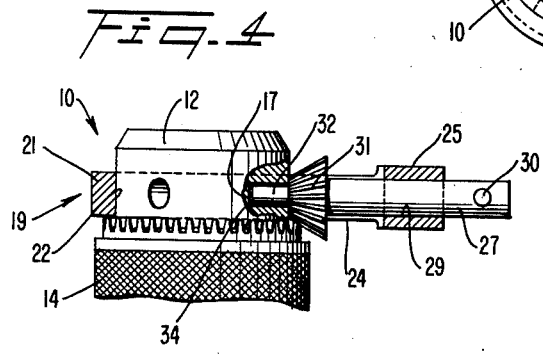
FIG. 4 is a view in vertical axial section through the key device, the section being taken along the line 3—3 of FIG. 2, certain of the parts being shown in elevation, the key being shown advanced into operative engagement with the chuck.
Figure 6:
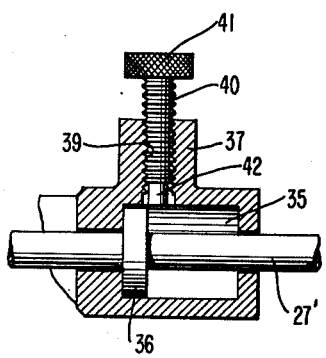
FIG. 6 is a view in enlarged section similar to the portion of FIG. 5 which shows a modified form of the key device.

The first disclosed embodiment of key device in accordance with the present invention is shown in FIGS. 3 and 4, wherein it is designated generally by the reference character 19. The key device 19 has a collar-like body 20 having a portion 21 in the form of part of an annulus having a circular cylindrical inner wall 22 extending normal to the general plane of body 19. Wall 22 has a diameter slightly greater than but closely approximating the diameter of surface 12 of body 11 of the chuck 10, so that such portion of the chuck is accurately received within portion 21 of body 20. The open end portions of portion 21 of body 19 are symmetrically and oppositely curved to merge with two similar spaced parallel arms 24 which extend to the right as shown in FIGS. 3 and 4, the outer ends of arms 24 being joined by an integral transversely extending end or bridge portion 25. It will be seen that the part-annular portion 20 of body 19, and thus surface 22 thereof, extend throughout substantially greater than 180°. Thus, when the body 19 is mounted on chuck 10 in the manner shown in FIGS. 3 and 4, the wall 22 prevents rocking of body 19 with respect to the axis of the chuck, not only of the broad area of engagement between surfaces 22 and 12, but also because of the embracing of surface 12 of the chuck by inner wall 22 well past the diameters of such surfaces.

The body 19 may be made as a casting, as a forging, or by being cut from a thick metal plate.

A chuck operating key, generally designated 26, has an elongated circular cylindrical shank 27 accurately rotatably and slidably mounted in a bore 29 which extends through bridge portion 25 of body 19 in a direction radial of the surface 22 and normal to the axis thereof, and is thus disposed radially of a chuck 10 when the latter is mounted in body 19 as shown in FIGS. 3 and 4. The key 27 is provided adjacent its outer end, outwardly of bridge 25, with a cross member or handle 30 by means of which the key may be turned. Inwardly of bridge 25, and between the spaced arms 24, the key is provided with a pinion 31 affixed thereto; the teeth of the pinion are tapered or beveled to converge toward the left (FIGS. 3 and 4) so as to mesh with the teeth of gear 15 on the sleeve 14 of the chuck.

Forwardly of pinion 31 the key 26 is provided with a circular cylindrical stub shaft or pilot pin portion 32 coaxial of shank 27 of the key, portion 32 having a diameter such that it is accurately received with any one of bores 16 in the body 11 of the chuck. The lengths of pilot pin portion 32 of the key, of pinion 31, and of arms 24 are such that the key may be slid to the right (FIG. 3) with respect to body 19 sufficiently for the forward end 34 of the pilot pin to clear the outer surface of body 11 of the chuck, whereby with the key in such position the key device 19 may be freely slid onto the chuck 10 in a direction axially thereof or removed from the chuck in the reverse direction.

After the key device has been thus mounted on the chuck, the chuck is turned relative to the key device to align the pilot pin 32 on the key with one of bores 16 in the body 11 of the chuck. The key is then slid radially inwardly to cause pin 32 to enter such bore 16 and pinion 31 on the key to mesh with ring gear 15 on the chuck operating sleeve. The key 26 may then be turned in the proper direction to tighten or loosen the chuck as desired.

It has been found that with the use of the key device 19 the chuck may be tightened much more forcibly upon the shank of a tool, with the same torque applied to handle 30 of the key, than when a key similar to key 26 but without body 19 is employed. This follows from the fact that the key 26 in the combination shown is accurately held coaxial of the bore 16 in which pin 32 is mounted both by reason of the engagement between pin 32 and such bore 16 and of the extended journalling engagement between the shank 27 of the key and the bore 29 in bridge 25 of body 20. The pinion 31 is thus straddle-mounted between two bearings when operatively engaged with ring gear 15. The tendency of the teeth of the gears to climb thus produces only a relatively small endwise or radially outwardly directed thrust upon the key since all tendency of the key to become misaligned by reason of the reaction between the gears and any sidewise thrust imposed thereon by the operator in turning the key being effectively counteracted.

Figure 5:
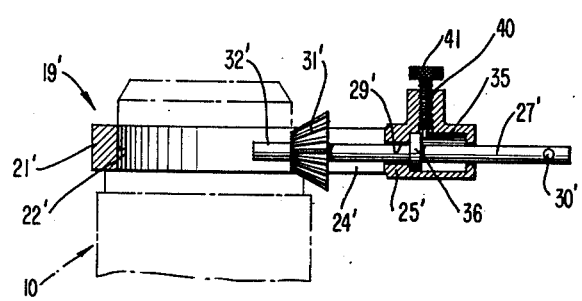
FIG. 5 is a view in section similar to FIG. 3 of a modified form of key device, such device incorporating means for postively retaining the gear of the key in optimum mesh with the gear on the chuck operating sleeve.
Figure 5:
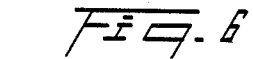

In some instances it may be desired to provide positive means on the key device to counteract all of the end thrust imposed on the key resulting from the interaction of the pinion and ring gear. One manner in which this may be accomplished is illustrated in FIG. 5, which shows a modified key device 19'. The parts of device 19' which are the same as those of the above-described key device 19 are designated by the same reference characters with an added prime.

The key device 19' differs from device 19 in the following particulars. Bridge 25' has an enlarged circular cylindrical bore 35 therein intermediate its radial length, bore 35 being coaxial of bore 29'. The shank 27' of the key has a collar 36 affixed thereto, the collar being slidable with the shank 27' in bore 35 between a retracted terminal position in which pilot pin 32' is withdrawn from surface 12 of chuck 10 and an advanced terminal position in which the pinion 31' of the key meshes with the ring gear 15 on the chuck 10. In such advanced position the collar 36 preferably lies adjacent the forward end wall of bore 35.

The key may be positively retained in its advanced position by selectively retractable abutment means mounted on the body 20 and adapted to engage the rear of collar 36. In the embodiment shown, the bridge 25' is provided with a hollow boss 37 integral therewith, the passage 39 through the boss being threaded. A stud 40 has threaded engagement with passage 39, the stud being turned by a knurled head 41 on the outer end thereof. The inner end 42 of the stud is circular cylindrical and of reduced diameter, the parts being so arranged that when the key is in its advanced, operative position the portion 42 of the stub may be advanced to lie rearwardly of the outer rim of collar 36. The inner end 42 of the stud thus absorbs all of the end thrust on the shank 27' of the key when the key is turned to tighten or loosen the chuck. After the chuck has been operated as desired, the stud 40 is turned so that portion 42 is retracted from bore 35, so that the key may then be retracted into its outer, inoperative position in which the key device may be removed from the chuck 10.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A key device for a chuck having a cylindrical main body with tool holding jaws adjustably mounted thereon, a jaw adjusting sleeve mounted on the body for rotation thereabout, the sleeve having a ring gear on the forward edge thereof, the body forwardly of the gear on the sleeve being exposed, such forward portion of the body having at least one radially directed bore therein, the key device comprising a frame having a part-annular portion open at one side and an integral bridge portion across the open side and spaced radially therefrom, the part-annular portion having a broad continuous part-circular inner surface adapted to removably fit over and closely embrace more than 180° of the circumference of the exposed chuck body, and a pinion fixed on a shaft with a pin extending axially from the pinion, said shaft being journalled in the bridge portion and mounted for sliding movement to alternatively advance the pinion to and retract it from meshing engagement with the ring gear of a chuck whose body is embraced in the frame, said pin being received within the bore in the body when the pinion is in mesh with the ring gear.

2. A key device as claimed in claim 1 including abutment means selectively engaging the shaft when the pinion is in meshing engagement with the ring gear to prevent retraction of the pinion therefrom.

3. A key device as claimed in claim 2 wherein said shaft has a collar fixed thereon and said abutment means comprises a stud retractably mounted on the bridge portion to engage the side of the collar away from the pinion when the pinion is in meshing engagement with the ring gear.

4. A key for a chuck having a circular body with a cylindrical wall, at least one radial bore in the wall and a ring gear disposed about the wall for tightening the chuck, said key comprising a ring adapted to fit over and substantially encircle the circular body and engage the ring gear, said ring having an inner cylindrical face adapted to snugly fit the cylindrical wall and to extend from the level of the gear above the level of the bore, an extension projecting outward from a side of the ring opposite a portion engaged with the wall, a bearing carried by the extension, a rotatable pin slidable in the bearing, a pinion gear on the pin and pilot pin on said pin adapted to fit the bore, said pilot pin and pinion gear being aligned with the bore and ring gear when the ring engages the ring gear.

5. A key according to claim 4 including means to lock the pinion gear in engagement with the ring gear.

References Cited by the Examiner

UNITED STATES PATENTS

| | | | |
|---|---|---|---|
| 2,467,827 | 4/49 | Hinton | 279—1 |
| 2,807,732 | 9/57 | Kurtovich. | |
| 2,826,950 | 3/58 | McClintock. | |

ROBERT C. RIORDON, *Primary Examiner.*